United States Patent [19]
Scott

[11] 3,812,832
[45] May 28, 1974

[54] DUAL FUNCTION THERMAL VALVE
[75] Inventor: Arthur A. Scott, Mount Prospect, Ill.
[73] Assignee: Eaton Corporation, Cleveland, Ohio
[22] Filed: Jan. 8, 1973
[21] Appl. No.: 321,502

[52] U.S. Cl. ....... 123/119 A, 123/97 B, 123/117 A, 123/198 R, 137/625.18, 251/331
[51] Int. Cl. ..... F02m 25/06, F02p 5/04, F02m 7/12
[58] Field of Search ......... 123/117 A, 97 B, 119 A, 123/198 R; 137/625.18; 251/331

[56] References Cited
UNITED STATES PATENTS

| | | | |
|---|---|---|---|
| 2,471,623 | 5/1949 | Hubbell | 137/625.18 |
| 3,136,336 | 6/1964 | Presmeyer | 137/625.18 |
| 3,400,698 | 9/1968 | Kelly | 123/117 A |
| 3,503,377 | 3/1970 | Benbough et al. | 123/117 A |
| 3,515,368 | 6/1970 | Kelly | 123/117 A |
| 3,580,284 | 5/1971 | Biwi | 137/625.18 |

Primary Examiner—Wendell E. Burns
Attorney, Agent, or Firm—Teagno & Toddy

[57] ABSTRACT

A dual function thermal valve system independently controls first and second valves or motors which in turn may control vacuum operated accessories such as a hydrocarbon emissions control, a distributor timing device or heater controls and the like. A diaphragm actuated by a thermal unit in a dual-function valve body separates a first normally open inlet and outlet from a second normally closed inlet and outlet. Valve seats for each inlet and outlet are so positioned that a first predetermined travel of the thermal unit communicates the second inlet with the second outlet at a first temperature while a second predetermined travel of the thermal unit at a second higher temperature closes the first inlet from the first outlet.

7 Claims, 5 Drawing Figures

PATENTED MAY 28 1974 3,812,832

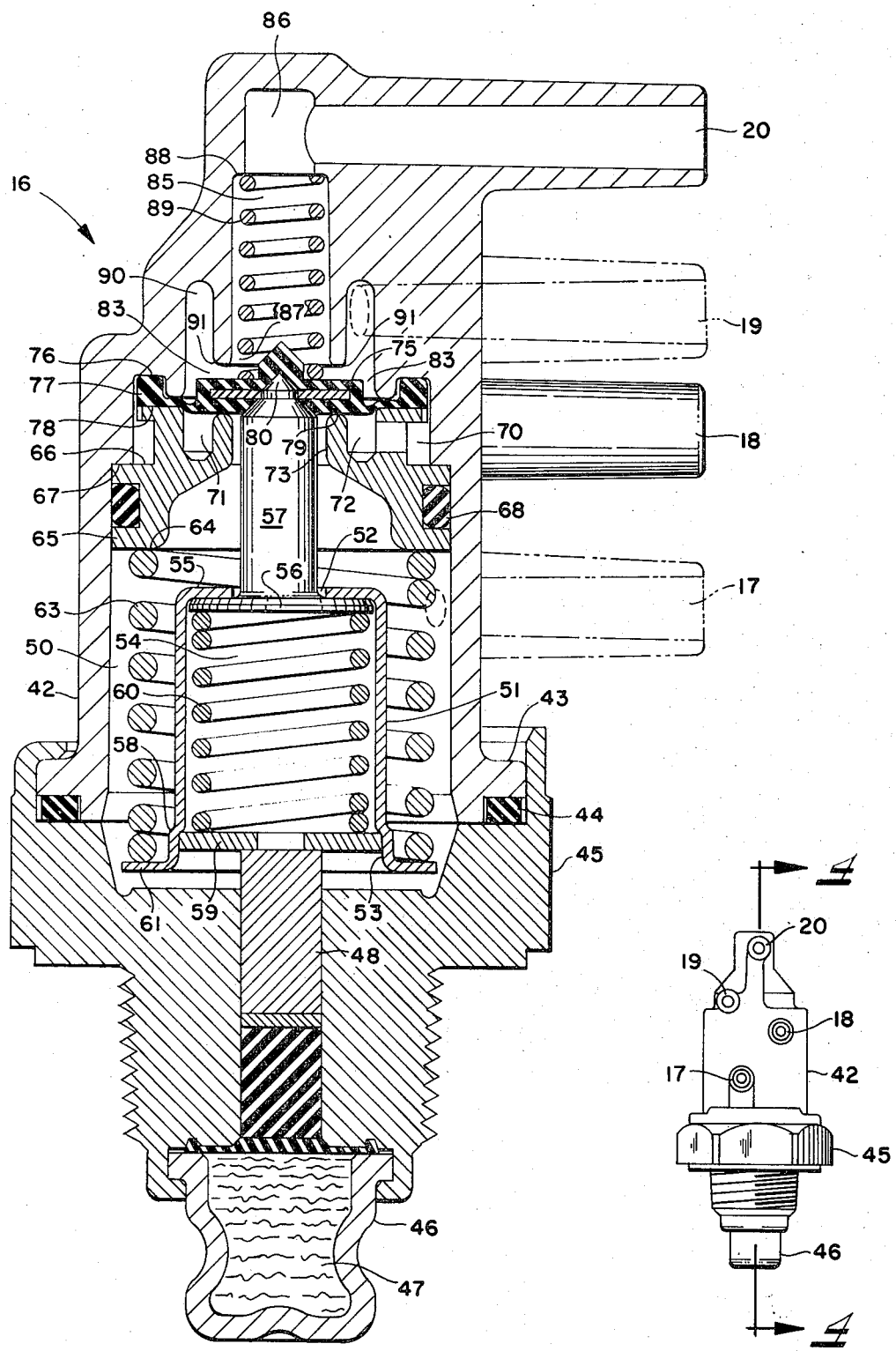

DUAL FUNCTION THERMAL VALVE

This invention relates to a valving system and more particularly to a dual function thermal valve employed therein.

The invention is particularly applicable to a dual function thermal valve regulating vacuum controlled accessories in an automobile which are dependent on varying temperature levels for actuation and will be described with particular reference thereto. However, it should be appreciated that the invention may have broader application and may be employed in any positive or negative pressurized system wherein motors or valves are to be actuated at varying temperature levels.

Many accessories in a motor vehicle are designed to be vacuum operated at predetermined temperature levels. Because the actuation temperature for each accessory varies, each vacuum device has heretofore been controlled by its own thermal unit which may be embodied as part of the vacuum device itself or as a separate thermal actuated valve controlling vacuum to the device. Thus, in vehicles employing an emissions control system utilizing an exhaust gas recirculating subsystem (EGR), a thermal actuated valve controls vacuum to a motor which actuates the EGR system at a predetermined temperature. The same vehicle may also employ a second thermal valve controlling another vacuum motor which may regulate the opening and closing of one or several heater doors controlling the flow of air through a heater core.

Furthermore, if one of the vacuum operated devices actuated by a thermal valve is to be controlled at three different temperature ranges instead of two, a second separate thermal actuated valve is employed in series with the first. Thus, three ported vacuum switches such as those illustrated in U.S. Pat. Nos. 3,400,698, 3,515,368 and 3,383,041 retard the distributor timing at a first lower temperature and advance the distributor at a second higher temperature. Heretofore, such devices required a second thermal valve if the timing was to be further regulated at a temperature less than that of the first temperature, or at a temperature higher than that of the second temperature.

It is thus a principal object of the subject invention to provide a valving system which eliminates the necessity of an additional thermal valve(s) by the utilization of a dual function thermal valve therein.

In accordance with the invention there is provided a valve body having normally open upper inlet and outlet ports separated by a diaphragm from normally closed lower inlet and outlet ports. A thermal power unit unseats the diaphragm at a first temperature from its lower seat to open the lower inlet and outlet ports. At a second temperature the diaphragm is biased into an engagement with an upper seat to close the upper inlet and outlet ports.

In accordance with another aspect of the invention, the lower inlet and outlet ports may be connected to a vacuum source and a vacuum motor respectively to control the exhaust gas recirculation in a hydrocarbon emission control arrangement. The upper inlet and outlet ports may be connected to a vacuum source and vacuum motor assembly respectively for regulating some aspect of a heater control system. Alternatively, the upper inlet and outlet ports may be connected to a standard three port switch of the above-described type and to the distributor respectively to provide a third temperature range and corresponding vacuum level controlling the spark advance of an automobile engine.

It is thus another object of the invention to provide a dual function thermal valve operative at different predetermined temperature levels to close and open two sets of inlet and outlet ports.

It is another object of the invention to provide a simple, vacuum operated valving system for controlling temperature regulated accessories in a motor vehicle.

Referring now to the drawings wherein the showings are for the purpose of illustrating a preferred embodiment of the invention only and not for the purpose of limiting same, FIG. 1 is a fragmentary and partially schematic view of the fuel supply and ignition system of an internal combustion engine constructed in accordance with the principles of the present invention;

FIG. 4 is a sectioned side elevation view taken along lines 4—4 of FIG. 3; and

FIG. 5 is an alternative embodiment of part of the arrangement shown in FIG. 1.

Figure 1:
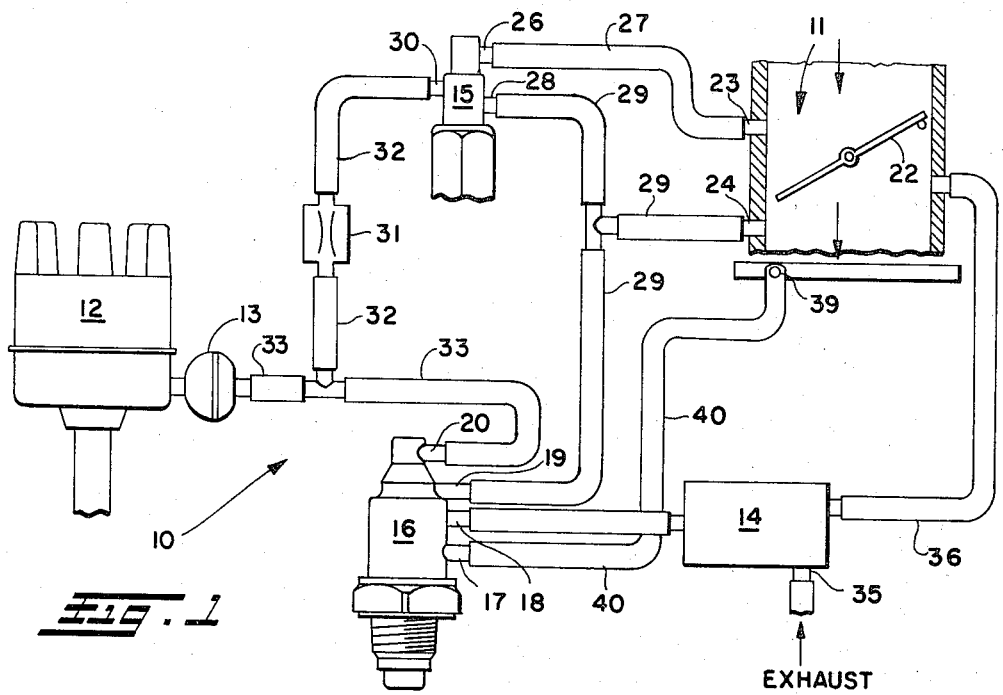

Referring now to the drawings wherein the showings are for the purpose of illustrating a preferred embodiment of the invention only and not for the purpose of limiting same, FIG. 1 illustrates an emission control system 10 applied to the fuel supply and ignition system of an internal combustion engine. The system 10 comprises a carburetor shown having an air intake passageway 11, a distributor 12 having a vacuum operated spark advance mechanism 13 and a vacuum motor and valve 14 for controlling nitrous oxide components of emission to the carburetor. A three port vacuum switch 15 connects the spark advance mechanism 13 with the air intake passage 11. A dual function thermal valve 16 has a lower inlet and outlet 17 and 18 connected to a source of vacuum and the vacuum motor and valve 14 respectively. An upper inlet and outlet 19 and 20 in the dual function thermal valve 16 is connected to the spark advance mechanism 13 and a source of vacuum respectively.

As will be understood by those skilled in the art, the air intake passageway 11 directs air from the atmosphere to a chamber for mixing the fuels such as gasoline from whence the mixture of combustible air and fuel is directed through an intake manifold to the various cylinders of the engine. When the engine runs at idle speed, a butterfly valve 22 in the air intake passage 11 is substantially closed and the pressure of the air in the intake passageway 11 on the upstream side of the butterfly valve 22 is at or near atmospheric. The air on the downstream side of the butterfly valve 22, however, is at a vacuum condition generally in the order of about 16 or 17 inches of mercury Hg. The engine speed increases as the butterfly valve (26) opens and thus the difference in the vacuum condition of the air on the upstream and downstream sides of the butterfly valve 26 decreases as engine speed increases. The air intake passageway 11 on the upstream side of the butterfly valve 22 is indicated at reference numeral 23 and is referred to hereinafter as the ported or carburetor chamber and the downstream side of the butterfly valve 22 is indicated at 24 and referred to hereinafter as the manifold chamber. Vacuum from ported chamber 23 and manifold chamber 24 is hereinafter referred to as ported vacuum and manifold vacuum respectively.

The spark advance mechanism 13 regulates the firing sequence of the spark plugs with respect to the positions of their respective pistons during the compression or power strokes of the pistons. The spark advance mechanism 13 is vacuum operated and when subjected to a high vacuum condition advances the ignition timing and when subjected to a low vacuum condition retards the ignition timing. Retarding the spark at idle results in more complete combustion and a reduction in noxious gases or hydrocarbons exhausted from the engine. In addition, it also results in an increase in the operating temperature of the engine. In contrast, advancing the spark results in an increased or "dirtier" operation of the engine from the standpoint of the amount of noxious gases being discharged to the atmosphere, but additionally results in a reduced operating temperature of the engine.

The three port thermal regulated vacuum switch 15 has a first inlet 26 connected by a line 27 to the ported chamber 23. A second inlet 28 is connected by a line 29 which is shown as "T'd" to the manifold chamber 24 and to the upper inlet 19 of the dual function thermal valve 16. An outlet 30 in a three port switch 15 leads by line 32 to a restrictor 31 which may be viewed as an orifice of predetermined size and shape which is then "T'd" into line 33 which communicates the spark advance mechanism 13 with outlet 30. The three port switch 15 is adapted to be placed in the water jacket of the engine and reference may be had to U.S. Pat. No. 3,400,698 for a better description of the operation and structure of such a valve than will be supplied herein.

The vacuum motor and valve diagramatically shown at 14 in FIG. 1 comprises a conventional form of a vacuum motor in which vacuum moves a diaphragm or piston against a spring to effect the movement of a valve member, either of the poppet type or butterfly type to allow flow to pass therethrough (not shown). More particularly, nitrous oxide components of emissions tapped from the exhaust system is directed by line 35 into the vacuum motor and valve 14 which when actuated directs the emissions into the intake manifold through line 36. Vacuum is supplied to the vacuum motor and valve 14 by line 37 communicating with the lower outlet port 18 of the dual function thermal valve 16.

The lower inlet port 17 of the dual function valve 16 communicates by line 40 with a special vacuum port 39 in the carburetor which supplies a variable source of vacuum under all operating conditions which vacuum is neither manifold or ported vacuum. As noted previously, the lower outlet port 18 is connected by ine 37 to the vacuum motor and valve 14. The upper inlet port 19 is connected by line 29 to the second inlet 28 of the three port vacuum switch 15 and also to the manifold chamber 24. The upper outlet 20 is connected by line 33 to the spark advance mechanism 13 and also to the restrictor 31.

Figure 3:
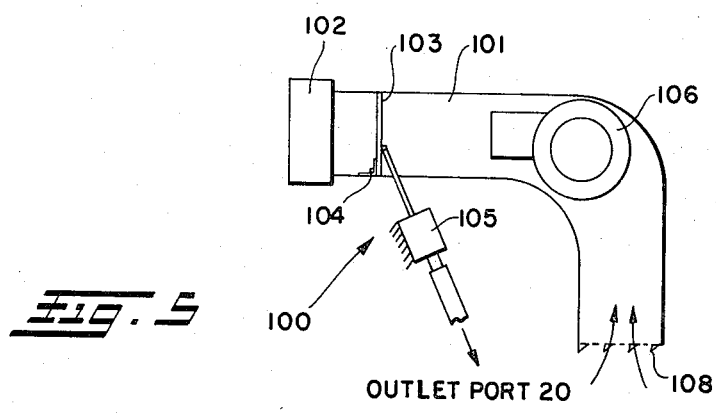
FIG. 3 is a side elevation of the dual function thermal valve.

Referring now to FIGS. 3 and 4, the dual function thermal valve 16 which includes a valve housing 42 having a radial flange 43 at its lower end with a seal 44 recessed therein and having sealing engagement with a plain upper face of a threaded coupling member 45. Coupling member 45 is adapted to be threaded in the cylinder head of an internal combustion engine and thusly locates the thermally responsive element 46 positioned on the end of the threaded coupling in the water jacket of the engine. The coupling 45 is crimped or otherwise secured to the flange 43 to retain the seal 44 in sealing engagement with the flange and coupling 45 and thereby provides an airtight connection between the flange and coupling.

As will be understood by those skilled in the art, the thermally responsive element 46 comprises a hollow body portion 47 filled with a wax or similar substance which expands upon it being heated and contracts upon being cooled. Projecting from one end of the body portion is a piston or plunger 48 which elongates when the thermally responsive element is heated.

Valve housing 42 is configured to define a lower, first generally cylindrically-shaped hollow portion 50 communicating at its upper end with a second generally cylindrically-shaped hollow portion 83 which, in turn, communicates at its upper end with a third generally cylindrically-shaped hollow portion 85, all three hollow portions, 50, 83 and 85 being centrally disposed within housing 42.

Hollow portion 50 receives a bell-shaped housing 51 having upper and lower open ends 52, 53 and forming a chamber 54 within to provide an overtravel arrangement for valve 16. The upper end 52 of the bell housing is turned in as at 55 to form a lip which extends over a circular base portion 56 formed at the lower end of a drive stud 57 which in turn extends upwardly from upper open end 52. A portion of the chamber wall adjacent the bottom end 53 of bell-shaped housing 51 is also turned in as at 58 to form an inwardly-extending lip which abuttingly engages a circular plate 59. Circular plate 59 contacts the thermal unit's plunger 48 along its bottom surface and serves as a spring seat for an overtravel spring 60 along its top surface which is compressed between the circular base 56 of the drive stud 57 and plate 59. The bottom end 53 of the bell-shaped housing has an annular outturned flange 61 formed therein which serves as a seat for one end of a first coil spring 63. The other end of the first coil spring 63 abuts against a lower flat base portion 64 of a specially configured generally cylindrical first valve seat member 65.

Valve seat member 65 has a centrally located opening or guide surface 73 receiving drive stud 57. Member 65 is disposed within and secured against movement within the lower hollow portion 50 by the compressive force of the first coil spring 63 which urges a middle flat base portion 66 of valve member 65 into abutting engagement with an annular step 67 formed in valve housing 42. The first valve seat member 65 is recessed between its middle and lower base portions 66, 64 and receives an O-ring 68 therein to prevent vacuum leakage along the wall of the lower valve hollow 50 and the valve seat member 65. Disposed above the middle flat base portion 66 of the valve seat member 65 is a first annular outwardly disposed opening or recess 70 in constant communication with the lower inlet port 18. A second annular opening 71 is formed in valve seat member 65 inwardly of the first annular opening 70 and in communication with said first annular opening by several passages 72 extending therebetween.

The inner wall of the second annular opening 71 and the guide surface 73 of the valve seat member 65 blend together to form a rounded profile or first valve seat 79. The first valve seat 79 defines the lower end of the second hollow portion 83 of the valve housing 42.

Disposed within the second hollow portion 83 is a diaphragm 75 which is secured within hollow portion 83 by a second inwardly-extending step or shoulder portion 76. Step portion 76 is formed in valve housing 42 which receives the outer edge 77 of the diaphragm which in turn is sealingly compressed by an upper flat base portion 78 of the first valve seat member 65. The diaphragm 75 is especially configured over its central portion to define a conical-shaped protrusion 79 and a hollow formed therein receives a pointed end 80 of the drive stud 57 to guide the diaphragm in its movement. The diaphragm is also shouldered over its central portion to receive a circular plate 81 which stiffens the diaphragm over its central area. The plate 81 has a central opening therein to receive the studs pointed end 80.

The third hollow portion 85 of valve housing 42 has a closed upper end portion 86 which constantly communicates with the upper outlet port 20 and a lower end portion 87 opening to the second hollow portion 83. A turned-in shoulder 88 formed in the third hollow portion 85 serves as a seat for one end of a second compression spring 89. Spring 89 is seated at its other end on the upper surface of the diaphragm 75 to maintain diaphragm 75 in sealing engagement with the first valve seat 79 when the thermally responsive element 46 is not actuated.

Extending outwardly of the third hollow portion 85 is a third annular opening 90 in valve housing 42 which is in constant communication with upper inlet port 19 and opens at its bottom end to the second hollow portion 83. More particularly, the inner wall of opening 90 and wall surface of third hollow portion 85 at their bottom ends blend together to form an annular rounded tip or second valve seat 91.

As thus described and with the thermally responsive element 46 in an unactuated position as shown in FIG. 4, vacuum from the lower inlet port 17 does not communicate with the annular opening 70, passages 72 and second annular opening 71 because it is dead-ended because diaphragm 75 is seated on the first valve seat 79. Thus, vacuum is prevented from communicating with the lower outlet port 18. Vacuum in the upper inlet port 19 communicates with the upper outlet port 20 via third annular opening 90, second hollow portion 83 and third hollow portion 85.

When the thermally responsive element 46 is fully actuated at a predetermined temperature, springs 63 and 89 are compressed and the diaphragm 75 is seated against the second valve seat 91 to prevent communication between upper inlet and outlet ports 19,20 while permitting communication between lower inlet and outlet ports 17,18. Further movement of the thermal responsive unit 46 to temperature above a predetermined movement results only in further compression of overtravel spring 60.

Importantly, slight movement of diaphragm 75 off first valve seat 79 at a predetermined temperature results in communication of lower inlet and outlet ports 17,18 while upper inlet and outlet ports 19,20 still remain in communication with one another. By varying the axial length of the second hollow portion 83 or using different wax fill substances in the thermally responsive element 46, the first temperature at which the diaphragm 75 moves away from the first valve seat 79 and the second temperature at which the diaphragm seats against the second valve seat 91 can be controlled. Thus, a slight or large temperature differential between the first and second temperatures can be designed into the dual function thermal valve 12.

Referring now to the operation of a prior art vacuum controlled valving system and more particularly to a prior art system which would be similar to that system diagrammatically shown in FIG. 1 except that a two port, on/off thermally regulated valve of a known type would be substituted for the dual function valve 16 shown in FIG. 1. The two port valve would be connected to the variable vacuum port 39 and to the vacuum motor and valve 14 and would actuate the vacuum motor and valve 14 to direct hydrocarbon emissions into the manifold of the engine when the temperature sensed by its thermal sensing unit reached or exceeded 128° F. The spark advance mechanism 13 of the distributor 12 would be connected only to the three port switch 15 which would retard the spark advance mechanism 13 by supplying ported vacuum thereto until a temperature of at least 225° F would be sensed by switch 15 whereupon manifold vacuum would be directed to the spark advance mechanism 13. As thus described, hydrocarbon emissions are directed into the engine while the spark advance of the engine is retarded. When this happens in a relatively cold engine with the spark retarded, the engine at idle or low speed begins to labor or runs "rough" as insufficient heat is generated to combust the EGR hydrocarbons without effecting engine performance. This tends to cause the engine to misfire and stall and create possible driving hazards. This condition is counteracted when the spark advance mechanism 13 is advanced or when a higher engine operating temperature is achieved.

Figure 2:
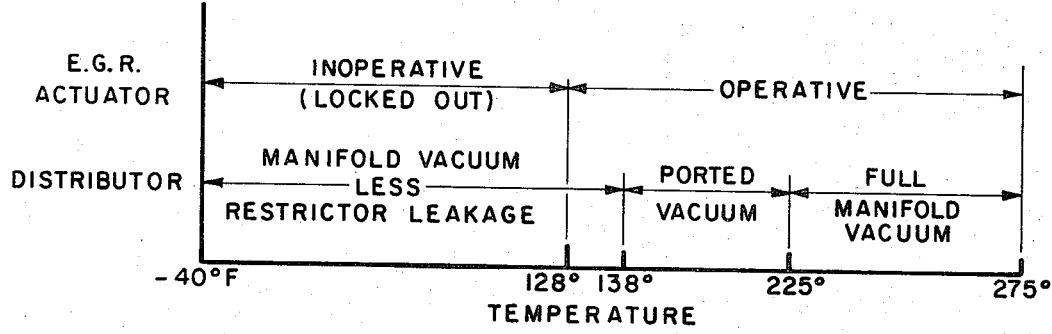
FIG. 2 is a graphical representation of the vacuum supplied at indicated temperatures for the arrangements shown in FIG. 1.

The valving system shown in FIG. 1 and its associated operational chart shown in FIG. 2 is designed to eliminate engine roughness by advancing the spark advance mechanism 13 when the engine is relatively cold and then retarding the spark advance mechanism when the engine reaches a higher operating temperature. This is achieved by the dual function valve which is designed to permit its upper inlet and outlet ports 19,20 to remain open until the second valve seat 91 is seated by diaphragm 75 at a temperature of 138° F. The lower inlet and outlet ports 17,18 are designed to communicate with one another upon movement of diaphragm 75 away from the first valve seat 79 at a temperature of 128°±3° F. Thus the upper normally open inlet and outlet ports 19,20 of dual function valve 16 supplies almost full manifold vacuum to the spark advance mechanism 13 as the orifice in the restrictor 31 is shaped to permit only a slight vacuum drop thereacross at low temperatures. This permits the spark advance mechanism 13 to be actuated at almost full manifold vacuum after the vacuum motor and valve 14 have been operated to direct hydrocarbon emissions into the intake manifold of the engine. When the temperature of the engine has exceeded its critical rough operating range at 138° F, the spark advance mechanism 13 is then retarded by the ported vacuum supplied by the three port switch 15.

FIG. 5 shows an alternative modification to the system illustrated in FIG. 1 wherein the spark advance mechanism 13 and three port vacuum switch 15 have been replaced with a heater control arrangement 100 shown diagrammatically. Briefly, the heater arrangement comprises a standard heater core 102, a duct 101 venting cold air to the heater by way of a cowl 108 in an automobile. A baffle or door 103 is disposed in duct 101 and is spring biased as at 104 in an open portion and maintained in a closed portion by a vacuum motor 105 which is actuated by vacuum supplied from upper outlet port 20. A blower motor 106 communicates with duct 101.

As thus described, cold air from the cowl 108 is prevented from entering the passenger compartment when the engine is cold because vacuum from outlet 20 actuates vacuum motor 105 to maintain the door in a closed position. When the coolant has been sufficiently heated vacuum in outlet port 20 ceases, rendering motor 105 inoperative to allow the door 103 to open under its spring bias. Cold air is then passed through heater core 100 in heat transfer relationship therewith to heat the vehicle's passenger compartment. If desired, the opening and closing of the door 103 could actuate a trip switch which would operate and shut off the blower motor 106 respectively.

The invention has been described with reference to a preferred embodiment. Obviously other modifications and alterations will occur to others upon reading and understanding same. It is my intention to include all such modifications insofar as they come within the scope of the appended claims.

It is thus the essence of my invention to provide a simple, temperature actuated valving system achieved by a dual function thermal valve which operates to port pressure at two independent temperature values.

Having thus defined my invention, I claim:

1. A temperature actuated valving system comprising:
   a. first and second pressure operated devices; and
   b. a dual function thermal valve having first and second inlet and outlet ports, said first and second inlet ports connected to a source of pressure, said first outlet connected to said first pressure device and said second outlet connected to said second pressure device, and a single thermal unit means within said valve communicating said first inlet with said first outlet at a first predetermined temperature and communicating said second inlet with said second outlet at a second predetermined temperature.

2. The system of claim 1 wherein said thermal valve includes a diaphragm positioned between said first inlet and outlet ports and said second inlet and outlet ports, a first and second valve seat for said first inlet and outlet and said second inlet and outlet respectively, and said thermal unit means operatively connected to said diaphragm to seat said diaphragm against said first seat at said first temperature and to seat said diaphragm against said second seat at said second temperature.

3. The system of claim 2 wherein said thermal valve further includes first, second, third and fourth openings communicating respectively with said first inlet and outlet and said second inlet and outlet ports respectively, said first opening communicating with said second opening when said diaphragm seats against said first valve seat and said third opening communicating with said fourth opening when said diaphragm is seated against said second seat.

4. A thermal actuated system for controlling vacuum accessories in a motor driven vehicle comprising:
   a first vacuum operated device controlling a first accessory and a second vacuum operated device controlling a second accessory; and
   a dual function thermal valve having first and second inlet and outlet ports therein, said first and second inlet ports connected to a source of vacuum, said first outlet connected to said first vacuum operated device, said second outlet connected to said second operated vacuum device,
   said thermal valve further having a switching hollow portion therein, first and second valve seats disposed at opposite ends of said hollow portion, passage means therein communicating said first inlet port with said first outlet port at said first valve seat and said second inlet port with said second outlet port at said second valve seat, seating means disposed within said hollow and movable from said first seat to said second seat, and thermal unit means engaging said seating means and transmitting movement to said seating means upon change in temperature.

5. The thermal actuated system of claim 4 wherein said first vacuum operated device comprises a vacuum motor and valve for controlling the flow of exhaust hydrocarbons into the fuel supply of the motor driven vehicle and said second vacuum operated device includes a three port thermal actuated switch having a first normally open port connected to a source of ported vacuum, a second normally closed port connected to a source of manifold vacuum and an outlet port connected to a spark advance mechanism for controlling the valve timing of the motor driven vehicle.

6. A dual function thermal valve comprising:
   a. a thermally responsive unit,
   b. a valve housing securing the thermally responsive unit to one end thereof,
   c. said valve housing having first, second and third contiguous hollow portions therein, and first and second inlet and outlet ports, said first outlet port communicating with said first hollow portion, said second outlet port communicating with said third hollow portion, first passageway means within said housing communicating said first inlet port with said second hollow portion, second passage means within said housing communicating said second inlet port with said second hollow portion;
   d. a first and second valve seat disposed at opposite ends of said second hollow portion; and
   e. seating means secured within said second hollow portion actuated by said thermally responsive unit to move from said first seat to said second seat upon increase in temperature.

7. The dual function thermal valve of claim 6 wherein said valve further includes an overtravel mechanism comprising an open-ended, bell-shaped housing disposed within said first hollow passage, a drive stud extending from one end of said bell housing to said diaphragm, piston means extending from said thermal unit to the opposite end of said bell housing and actuated thereby, and a spring compressed between said drive stud and said piston means.

* * * * *